United States Patent [19]

Abler

[11] Patent Number: 4,462,684

[45] Date of Patent: * Jul. 31, 1984

[54] SINGLE WHEEL CELESTIAL NAVIGATOR

[76] Inventor: William L. Abler, 3350 S. Michigan, Chicago, Ill. 60616

[*] Notice: The portion of the term of this patent subsequent to May 22, 2001 has been disclaimed.

[21] Appl. No.: 310,071

[22] Filed: Oct. 9, 1981

[51] Int. Cl.³ .......................... G01C 1/00; G01C 1/14
[52] U.S. Cl. ..................................... 356/146; 356/146
[58] Field of Search ............................... 356/145–146, 356/144, 147, 248, 253–255, 141; 33/268–271, 277; 350/32–34, 50; 250/203 R

[56] References Cited

U.S. PATENT DOCUMENTS

| 914,754 | 3/1909 | Saegmuller | 350/34 |
| 2,316,466 | 4/1943 | Storer . | |
| 2,527,189 | 10/1950 | Kittelson . | |
| 2,566,312 | 9/1951 | Cable . | |
| 3,046,830 | 7/1962 | Pierce et al. | 356/146 |
| 3,207,025 | 9/1965 | MacDonald | 350/52 |
| 4,083,636 | 4/1978 | Owen | 356/141 |
| 4,294,541 | 10/1981 | Abler | 356/145 |

FOREIGN PATENT DOCUMENTS

| 474100 | 3/1929 | Fed. Rep. of Germany | 33/268 |
| 960383 | 6/1964 | United Kingdom | 350/33 |

OTHER PUBLICATIONS

Herrick, S. "Instrumental Solution in Celestial Navigation", Navigation vol. 1, 6-1946, pp. 22-27.

Primary Examiner—William H. Punter
Attorney, Agent, or Firm—Jacques M. Dulin

[57] ABSTRACT

Single wheel celestial navigational instrument and method of determination of local latitude and local hour angle of Aries by a single sighting on the night sky. Greenwich hour angle of Aries and latitude are obtained by simple reference to the instrument's scales and to a watch and Nautical Almanac; sight reduction tables, plotting boards and charts are not required. The instrument comprises a sky assembly and a horizon assembly. The sky assembly includes a closed central axial tube on which are rotatably mounted a combined periscope/telescope tube for sighting a first star and a periscope tube for sighting a second star, the sidereal hour angular positions of both of which are set with respect to a single graduated wheel and the polar distances of each periscope turret with respect to protractor scales. The horizon assembly comprises a periscope/telescope assembly mounted on the central axial tube and indexed to the same graduated (calibrated) wheel to read the local hour angle of Aries, and to a protractor scale to read the local latitude. A beam splitter, mirrors and optical lens elements are mounted to permit simultaneous observation of two stars and the horizon.

10 Claims, 6 Drawing Figures fig. 1 fig. 3

SINGLE WHEEL CELESTIAL NAVIGATOR

RELATED CASES

Other copending applications of mine relating to various improvements in celestial navigation instruments are Ser. No. 49,567, filed Jun. 18, 1979, entitled, BI-PERISCOPIC INSTRUMENT FOR USE IN DETERMINING TERRESTRIAL POSITIONS THROUGH CELESTIAL OBSERVATION, now U.S. Pat. No. 4,294,541, issued Oct. 13, 1981, and Ser. No. 239,504, filed Mar. 2, 1981, entitled CELESTIAL NAVIGATOR. The disclosures thereof are incorporated by reference herein.

FIELD

The invention relates to celestial navigational instruments and more particularly to simple mechanical/optical instruments, having a single graduated wheel, which permit direct sighting of an index star, with simultaneous, indirect, and superimposed sighting of a second reference star and the horizon to permit determination of the navigator's ground position, whether such navigator is located on (land or sea) or above (in the air) the surface of the earth using only the instrument, a watch and a Nautical Almanac, but without need for sight reduction tables, an assumed position, complex sightings such as dropping a celestial object to the horizon as in a sextant, knowledge of spherical trigonometry, knowledge of the navigational triangle, plotting boards, charts, parallel rules, calipers, and the like. Several embodiments are disclosed.

BACKGROUND

Positions for both celestial and terrestrial objects are specified in spherical coordinates. Celestial navigation becomes complicated by the fact that these spherical coordinates must be converted to rectangular coordinates for representation and positional location on flat charts or maps. Accordingly, current procedures for celestial navigation generally require cumbersome and highly sophisticated equipment, as well as volumes of resource materials and considerable navigational training for proper use. Some of the equipment requires use of an assumed position, or that only certain selected reference stars such as the North Star, Polaris, be used. When that star is not visible, such equipment cannot be employed. Typically, plotting boards, maps or charts, and volumes of tables as well as a knowledge of spherical trigonometry or of the navigational triangle are required to be employed along with the currently commonly used navigational devices such as the sextant or transit. Simple "special cases" exist, such as the meridian crossings of celestial objects. These have the disadvantage that they require several sightings over an extended period of time, and can rarely be used for twilight sightings.

While the space requirements for navigational instruments and supplementary materials may not be objectionable on board large ships, they may become so where space is at a premium such as on smaller vessels, in aircraft or during land exploration. While modern computers afford an avenue for memory storage of tables, and the algorithms for the computations, they are not reliable in case of emergency for most uses, such as land exploration or small vessels. In addition, these instruments are highly complex, delicate, and may require power sources which are not available. In addition, highly sophisticated electronic equipment is highly subject to corrosion and malfunction under adverse exploration or nautical conditions.

Efforts to develop mechanical equipment which requires less space and which may be easier to use for a person without extensive navigational training have met with only limited success. For example, the Storer U.S. Pat. No. 2,316,466 and the Cable U.S. Pat. No. 2,566,312 both are dependent for their operation on the visibility of the pole star.

The Cable instrument is discussed in Herrick, S., "Instrumental Solution in Celestial Navigation," *Navigation*, Vol. 1, No. 2, June 1946, pages 22-27. In addition, FIG. 4 thereof shows and instrument for determination of latitude and longitude from simultaneous observation of two stars. The Herrick instrument design is illustrated as mounted on a yoke with a gyro-stabilized base. Herrick uses a pair of sidereal hour angle circles which are separated by the yoke mount into which a sighting tube is journaled. It is not clear that this instrument was in fact built as it is stated therein to be conceived of as a part of a more elaborate mechanism involving gyrostabilization, clockwork and a compass repeater.

Other references illustrative of the art are Maloney, Elbert S., *Dutton's Navigation and Piloting*, Naval Institute Press, Annapolis, MD., 1978; Bowditch, Nathaniel, *American Practical Navigator*, Defense Mapping Agency Hydrographic Center, Washington, D.C. 20390, 1977; Saegmuller, U.S. Pat. No. 914,954; Kittelson, U.S. Pat. No. 2,527,189; Pierce U.S. Pat. No. 3,046,830; MacDonald, U.S. Pat. No. 3,207,025; and Owen, U.S. Pat. No. 4,083,636; Zeiss Ikon, German Pat. No. 474,100, Mar. 14, 1929; and Hopp, British Pat. No. 960,383, published Jun. 10, 1964.

Accordingly, there is a need for a mechanical/optical instrument of relatively compact size which is especially suited to use in small boats, lifeboats or expeditions where space, equipment and expertise may be limited. The present invention provides such an instrument which requires for supplementary material only the very minimum: a watch, a current Nautical Almanac (such as Nautical Almanac for the year 1980 obtainable from the U.S. Government Printing Office, Washington, D.C. 20402) and simple writing materials. The present instrument does not require knowledge of spherical trigonometry or of the navigational triangle. No complex sight reduction tables, plotting boards or even charts are needed. Sight reductions can be carried out by use of simple arithmetic.

In the principal embodiment the instrument of the present embodiment is completely optical/mechanical in its construction and has no batteries to run down or corrode. No assumed position is needed for sight reduction so that faulty information, or lack of information concerning one's position is not a disadvantage. The horizon portion of the instrument of the present invention may be aimed at either the east or west horizon in use allowing the user to use one horizon if the other is obscured or obstructed from view. The instrument is also natural for its human user in that the user can pick a star and directly sight a telescope/periscope element at the star. The user faces directly toward the celestial object being used, and thus finding and holding a star in the instrument's field of view is both natural and easy. The instrument can also be equipped with a bubble horizon or other artificial horizon for use in the air or on land where the natural horizon may not be usable. In another embodiment a simple gearing mechanism may permit tracking stars automatically.

THE INVENTION

OBJECTS

It is among the objects of this invention to provide an improved navigational instrument which is relatively compact, highly portable, and does not require the user to have sophisticated knowledge or cumbersome plotting boards or volumes of sight reduction tables.

It is another object of this invention to provide a celestial navigational instrument for determination of local latitude and local hour angle of Aries by a single sighting on the night sky, which employs only a single calibrated wheel on which both SHA's of axis and index stars are set and from which the LHAγ is read.

It is another object of this invention to provide a celestial navigation instrument which permits determination of the user's position at or above the surface of the earth using, in addition to the instrument, only a timepiece and a sidereal almanac such as the Nautical Almanac, and as a minimal writing surface and writing instruments are needed, the calculations, being of arithmetic type, may easily be written on a 3×5 inch card.

It is another object to provide a celestial navigational instrument which avoids the use of complex sight reduction because all calculations are carried out in spherical coordinates.

It is another object of this invention to provide a celestial navigator of a type which does not require knowledge of an assumed position, thereby being particularly useful for persons even if they have no prior knowledge of their position, or if their positional information is incorrect, such as shipwrecked persons or plane crash victims.

It is another object of this invention to provide a celestial navigational instrument and method of its use which requires only simple arithmetic so that little or no previous training is needed to learn its use, and which persons can learn to use quickly even under emergency conditions to accurately locate their position.

It is still another object of this invention to provide a relatively simple and durable optical-mechanical celestial navigator which does not have the deficiencies of a highly sophisticated electronic device which is sensitive to power falure, corrosion or extreme temperatures, yet which gives excellent accuracy for positional determination.

It is still another object of this invention to provide a celestial navigational instrument which gives accurate position determinations from objects, regardless of their angular separation, including those which are nearly 180° apart, and which may differ greatly in their luminosity, for example, the sun and the moon.

It is still another object of this invention to provide a celestial navigational instrument which simultaneously provides superposed images of two celestial objects and a view of the horizon for single sighting method of determination of local latitude and local hour angle of Aries.

Still further and other objects of this invention will be evident from the summary, figures, and detailed description which follow.

SUMMARY

The celestial navigation instrument of this invention comprises a central axial tube, which in use points toward the user's local celestial pole, and which has a sky periscope mounted at one end and a horizon telescope mounted at the other end thereof, both of which are mounted at right angles to the axial tube and capable of rotating 360° around it. The sky periscope is equipped with a sky telescope which is fitted with an ocular for direct sighting of an axis star. The horizon telescope simultaneously views the horizon in an annular image around the centrally viewed axis star. In addition, the midportion of the central axial tube comprises a periscope "T" to which is fitted a reference turret for sighting an index star. The image of the index star is superposed on the image of the axis star by means of a beam splitter which is used as a beam combiner, which beam combiner is located in the sky telescope at the junction thereof with the axis turret to which the sky telescope is attached.

The sky telescope and horizon element are each rotationally secured to a sky elbow and horizon elbow, respectively, which are journaled on the ends of the central axial tube. Rotation of the sky elbow and the periscope "T" in the middle of the central axial tube permits the telescope and reference turret to sweep out a full circle of the sky from east to west. Rotation of the axis turret and reference turret allows the sky telescope and reference turret to sweep out a full circle of the sky from north to south.

In combination, rotation of the elbows and turrets permits the instrument to look simultaneously at two celestial objects in the sky, with north-south coordinates being set on protractors referenced to the rotating turrets by pointers (verniers or other indicators), and with east-west coordinates being set on a graduated wheel mounted with its plane perpendicular to the central axial tube between the medial periscope "T" section of the instrument and the horizon observing device, or elbow. The appropriate indicators are carried by radial arms projecting from the turret, elbows, or periscope "T", as the case may be. The horizon element in one embodiment has a rotating horizon telescope attached at its outer end containing a crosshair which can be aligned with the local horizon. When the crosshair is aligned with the local horizon, the local latitude in degrees is read directly from a protractor scale mounted in association with the elbow, and the distance of the user east or west from the prime celestial meridian (local hour angle of Aries), LHAγ, is read directly from the graduated wheel spaced medially between the medial periscope "T" portion of the central axial tube and the horizon elbow.

To use the instrument, the user selects two celestial objects, such as stars, favorably placed in the sky, and finds in the Nautical Almanac the east-west coordinates (sidereal hour angle, SHA) and the north-south coordinates (polar distance, PD, which equals 90°± the declination listed in the Almanac). The user then assigns one star to the sky telescope, which star is termed the axis star, and the other star to the reference turret, which star is termed the index or reference star. The indicator on the sky elbow is then set on the graduated wheel opposite the SHA of the axis star, and the indicator of the periscope "T" is set on the graduated wheel opposite the SHA of the index star. The user then sets the PD of the stars on the scales attached to the axis turret (for the axis star) and the reference turret (for the reference star). The graduated wheel is then rotated so that the indicator mounted on the horizon assembly side of the medial "T" is set, on the graduated wheel, to the SHA of the index star.

The user then points the sky telescope toward the axis star and rotates the instrument around the telescope until the reference star appears superimposed over the axis star. When the two star images are superimposed, the central axial tube is pointed at the local celestial pole, and the zero on the graduated wheel is pointed toward the prime celestial meridian. The horizon elbow and turret is rotated until the horizon crosshair coincides with the local horizon. The local latitude is then read from the protractor scale attached to the horizon elbow. The LHAγ is read from the graduated wheel by the index attached to the horizon elbow.

The instrument contains various image transmitting mirrors and lenses so that a user looking through the sky telescope ocular may view both the axis and index stars and the horizon. The horizon is viewed in an annular area around the central image of the two, superimposed, axis and index stars. In a separate embodiment, an artificial horizon assembly may be substituted for the horizon telescope in the form of a circular bubble chamber mounted within a tubular barrel at the bottom or top thereof, and a mirror which reflects the image of the bubble device into the horizon elbow and thence to the ocular of the sky telescope. When the view has adjusted the horizon bubble element by rotation of the horizon turret and elbow, the viewing axis of the horizon element will extend horizontally.

In another embodiment, the horizon elbow is fitted with a spring or battery-powered motor which is geared to drive the horizon elbow coaxially around the axis of the central axial tube. This permits the user to allow the instrument to track stars automatically, freeing the user to adjust the latitude and the LHAγ at leisure, then disengage the motor and note the time for more precise location determinations.

For operations south of the Equator, the graduated wheel is turned in place end for end so that the instrument will be equally operative in the southern hemisphere.

It can be seen that the use of the instrument permits precise determination of geographical position whether the user is located on or above the earth's surface by use of simple arithmetic only. No knowledge of complex spherical trigonometry or of the navigational triangle is required. The only supplementary materials required are a timepiece and a current Nautical Almanac to provide the SHA and declination information on selected stars. No complex sight reduction tables, plotting boards or charts are required. The instrument is completely optical-mechanical in construction, is entirely portable, and accordingly suitable for field use on expeditions, on small boats, or in lifeboats. The operation of the instrument does not require knowledge of an assumed position and permits the user to face directly toward the celestial object such as the axis star being used.

By use of filters over the reference turret or the sky telescope objective, sighting can be made of very bright celestial objects, or of objects differing greatly in brightness. Because the mirrors of the present instrument rotate around the axis of sight instead of perpendicular to it as does the index mirror of a sextant, the scale of the instrument of the present invention yields an accuracy of measurement equivalent to that of a sextant arc of double the radius. Further, the instrument is not subject to loss of angular field of view during high altitude sights. This is quite unlike a sextant which does lose angular field for high altitude sights. Further, the horizon element may be used for observation of either east or west horizons, giving the instrument flexibility in case one horizon is obscured or obstructed. There is no requirement for the user to "drop" a celestial object to the horizon, or to precalculate its approximate anticipated altitude in order to use the instrument. The instrument is particularly well suited for simple instruction, quick learning for emergency use and in situations where space, time, experience, or weight are limited, or durability is a requirement.

DETAILED DESCRIPTION

The following detailed description is by way of example and not by way of limitation of the principles of this invention and shall make reference to the various elements of the figures.

Figure 1:
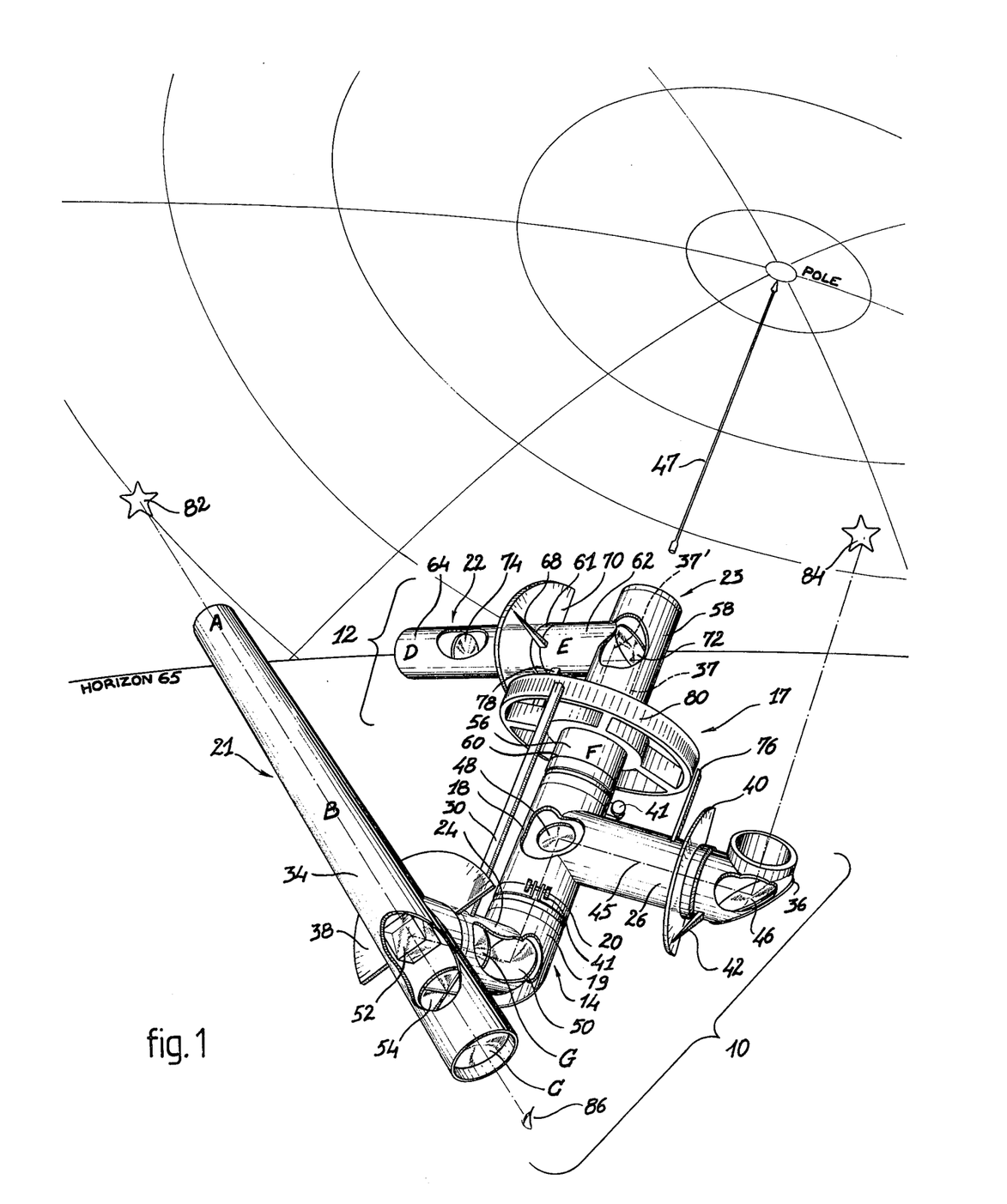
FIG. 1 is a perspective view of a principal embodiment of the invention, with sections broken away showing the principal optical elements of the system and the single wheel.
Figure 3:
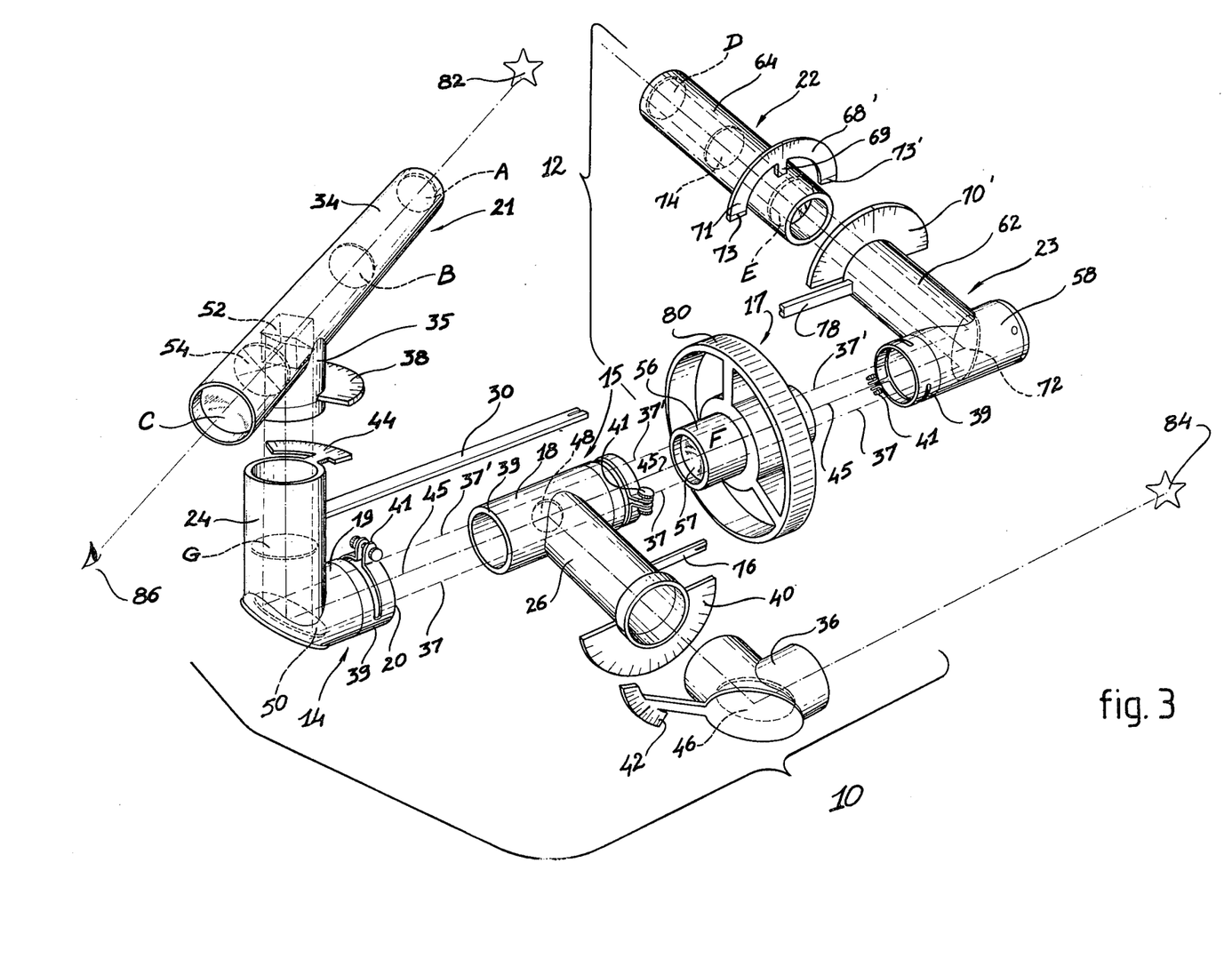
FIG. 3 is an exploded view of the entire instrument of FIG. 1 showing the single graduated wheel from which LHAγ is read and on which axis and index star SHA's are set.

Turning first to FIG. 1, and FIG. 3 for the exploded disassembled view, the celestial navigator of this invention comprises two principal parts, the sky assembly 10 and horizon assembly 12. The central tubular axis of the instrument is comprised of periscope "T" assembly 15, and graduated wheel assembly 17, best seen in FIG. 3. The graduated wheel assembly 17 comprises a calibrated circle or wheel 80 which is marked with 360° of gradations mounted with its plane perpendicular to an axial tubular member 56. Mounted in the tube 56 can be seen collimating lens 57 (also marked F) which is the collimator lens for the horizon telescope 64. The periscope "T" assembly 15 fits over the distal end of sky telescope assembly 21, 14, described below, and the proximal end of graduated wheel assembly 17 as best seen in FIG. 1. Together these three tubular sections define three coaxial tubes which rotate independently of one another about their common axis, which is the optical path for the index star and the horizon (whether natural or an artificial bubble horizon) as described in more detail below. Each of these parts can be fixed with respect to the others by sleeve 39 and knurled tightening screws 41 in a manner commonly known in the art. This is so that when these parts are set with respect to each other, their relative positions can be maintained while other parts of the instrument are rotated with respect to each other.

The periscope "T" assembly 15 has an index or reference periscope tube 26 attached perpendicular to the central axis which includes the central axis of the instrument which includes the axis of periscope assembly axial tube 18. Attached to this tube is vernier or indicator 76. Vernier 76 permits reading of the position of the periscope "T" assembly with respect to the graduated circle 80. Reference or index turret 36 is attached by a sleeve to the distal end of the periscope tube 26 and provides a sight line to index or reference star 84. Also attached adjacent the distal end of the periscope tube 26 is a graduated protractor 40. The angular position of the turret sight line with respect to the axis of the axial tube 19, 18, 56, 58 is determined by the indicator (pointer) 42.

Attached by a sleeve at the proximal end of the periscope "T" assembly 15 is a sky elbow 14 which comprises an axis star periscope tube section 24 secured perpendicular to the axis of sky elbow axial section 19. The axis of axial section 19 is likewise parallel to and coaxial with the main axis of the instrument which is the axis of the graduated wheel assembly 17, the periscope "T" assembly 15, and the axial tube 58 of the horizon elbow assembly 23. Secured to the sky periscope tube section 24 is vernier 30 which permits reading of the angular position of the sky elbow assembly 14 with respect to the graduated wheel assembly 17. The tube section 24 may be secured tightly by a sleeve 39 and lock screw 41. These angular positions indicated by indicators 30 and 76 are sidereal hour angles; the sidereal hour angle of index star 84 being set on verniers 30 and 76 with respect to the graduated circle 80, and the sidereal hour angle, SHA, of the sky elbow and sky telescope section being also set by vernier 30 with respect to graduated circle 80.

The sky elbow section sleeve fits snugly on the periscope assembly 15 as seen by part line 20 in FIG. 1. Similarly, the periscope "T" assembly 15 fits snugly onto graduated wheel assembly 17 as seen by part line 60 in FIG. 1.

Figure 2:
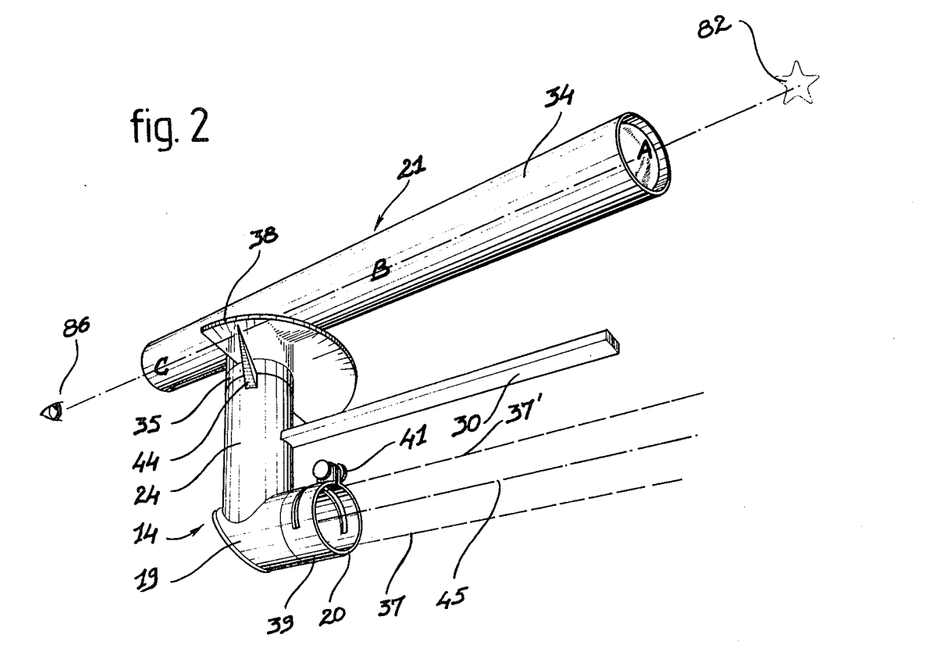
FIG. 2 is another perspective of the sky telescope portion of the sky assembly mounted on its axis turret and on the sky elbow showing more clearly the pointer and indexing protractor assembly.

A sky telescope assembly 21 is rotatably secured to the distal end of sky periscope tube 24 by axis star turret sleeve 35, as best seen in FIGS. 2 and 3. Sky telescope 34 is secured perpendicular to the axis of sleeve 35. In turn the axis of sleeve 35 is coaxial with the axis of the sky periscope tube 24. The sky telescope 34 mounted on sleeve 35 together form the axis turret. Affixed to the turret assembly 21 is a calibrated protractor 38. The telescope 34 on its sleeve 35 can rotate around the axis of the periscope tube 24, and the angular position thereof is indicated by pointer or vernier 44 (best seen in FIG. 2). The sky telescope provides observer 86 a sight line toward the axis star 82, and is a direct sighting of the star.

The horizon assembly 12 comprises (in the principal embodiment) horizon telescope assembly 22 journaled in the distal end of horizon elbow assembly 23, which in turn is attached by a sleeve to the graduated wheel assembly 17. The horizon elbow assembly comprises an axial tube section 58 to which is attached at right angles thereto a horizon periscope tube 62. The distal end of tube 58 is capped. The horizon periscope tube 62 has secured thereto a pointer or vernier 68 which indicates the polar angle of the horizon telescope 64 by cooperation with calibrated protractor 70 attached to the horizon telescope assembly 64. Part line 61 in FIG. 1 illustrates the snug fit of the telescope tube to the end of the horizon periscope tube 62. Note that FIGS. 1 and 3 show alternate embodiments. In FIG. 3 the protractor 70' is secured to the distal end of horizon periscope tube 62 while the vernier 68' is attached to the horizon telescope 64. In FIG. 3 the vernier 68' comprises a radial member 69 and an annular segment 71 attached thereto. The annular segment is somewhat more than 180° around the telescope 64 and contains two vernier markings 73, 73' so that the telescope may be used for either an east or west horizon with the same calibrated 180° protractor. Thus, the protractor 70' need not be a full 360°. In FIG. 1 the vernier or pointer 68 is mounted on the horizon periscope tube 62 while the protractor 70 is mounted on the telescope 64.

The horizon periscope tube 62 also has mounted adjacent the distal end thereof the indicator 78 so that the local hour angle of Aries, LHA$\gamma$, can be read from the graduated circle 80. Note that the telescope 64 provides a sight line to the horizon 65 as best seen in FIG. 1.

The optical path is next described in particularity with respect to FIG. 1, and thereafter the operation of the instrument will be described in detail. The sky telescope 34 contains an objective lens at A, an erector lens at B, and an ocular lens at C. In addition, reticle 54 has disposed thereon crosshairs aligned to cross at the axis of the sky telescope tube 34.

Horizon telescope 64 includes an objective lens at D, an erector lens at E, and a collimator lens at F (57) placing the images of horizon 65 and reticle 74 at optical infinity with respect to the optical system of the sky telescope 34. As seen in FIGS. 1 and 3, the horizon telescope also contains a reticle 74 which contains a single hair which, by rotation of the barrel of telescope 64 around its axis, is aligned with the horizon 65. The light or image of the horizon 65 enters the horizon telescope 64 via the objective lens D, and the light is redirected at 90° by the diagonal mirror 72 mounted at 45° with respect to the central axis of the instrument (which axis has been described above), and at 45° with respect to periscope tube 62. The reference turret 36 has positioned therein at 45° to the axis of both the turret opening and the periscope tube 26 a diagonal mirror 46. Likewise, disposed at a 45° angle to the periscope tube axis 26 and the central axis of the instrument is a small diagonal mirror or beam splitter 48. The mirror is suspended at the "T" juncture of the central axis of periscope assembly axial tube 18 and the periscope tube 26. The image of index or reference star 84 as viewed through the reference turret 36 is reflected off both mirrors 46 and 48 coaxial with the image of the horizon which has been reflected off the mirror 72. Both images are then reflected off diagonal mirror 50 which is aligned at 45° to the axis of both portions of the sky elbow assembly 14 (coaxial section 19) and the sky periscope tube 24. These images are then reflected off the partially silvered portion of the beam splitter 52 aligned in the central axis of the sky telescope 34. In this invention the beam splitter operates as a beam combiner. The observer 86 then sees in a central spot corresponding to the size of the diagonal mirror 48 the superimposed images of the axis star 82 and the reference star 84 when they are precisely aligned by appropriate rotation of the turrets and periscope tubes of the instrument. Surrounding this field of view on either side thereof is the image of the horizon and the alignment hair of reticle 74. In addition, the crosshairs of reticle 54 will be visible. When the images of the two stars 82 and 84 overlap at the intersection of crosshairs 54, the alignment is then precise, and the two superimposed star images are precisely centered in the central field of view.

As best seen in FIG. 3, lens 57 acts as a collimating lens or focus corrector for the horizon telescope, placing the images of the horizon 65 and crosshair 74 at optical infinity with respect to objective lens G, which acts as a second objective for telescope 34, allowing ocular C to form simultaneous images of index star 84, horizon 65, and horizon reticle crosshair 74. As best seen in FIG. 2, the annular image from the horizon telescope is represented by sight lines 37, 37' while the index star image is represented by sight line 45.

Also shown in this figure are sleeves 39 with clamp assembly 41 at the several junctures between part lines of the various assembly parts: the turret of sky telescope 34 and sky elbow 14; one adjacent part line 20 as seen in FIG. 2; one at each end of the periscope assembly axial tube 18; one at the proximal end of horizon elbow axial tube 58; and one at the juncture between the horizon telescope 64 and the horizon periscope tube 62. In the alternative to the sleeve junction and screw tightening arrangement, the tubes may be held in place by a press fit, or by an adjustable friction fit, or by a set screw or the like. Rather than turning the various parts by hand with respect to each other for their alignment, the junctions could be fit with circular worm gears or by rack and pinion gears for more precise and/or smooth adjustment. However, it has been found that the simple sleeve junction as described herein is suitable for satisfactory alignment of the various parts prior to sightings, permitting accurate determination of positions.

The instrument is used as follows: The user selects two stars such as the axis star 82 and the index star 84. It should be noted that neither star needs to be the polar star. In addition, the two celestial objects could be the sun and moon, the moon and another star, or any other pair of celestial objects simultaneously visible. In the case the sun and/or moon is used, an appropriate filter may be employed at either the objective lens end of the sky telescope 34 or at the opening of the reference turret 36.

The sidereal hour angle, SHA, and the declination, DEC, are obtained for each celestial object to be used from the Nautical Almanac for the given year. In the case of the sun, moon, and planets, SHA and PD must be computed for a five or ten-minute time "window" during which a sighting is expected to be taken. The user 86 then assigns the sky telescope 34 to one of the objects and the sky periscope reference turret to the other. The indicator 30 is set opposite the SHA for the chosen axis star 82 on the graduated wheel 80. Likewise, the vernier indicator 76 is set on the graduated wheel 80 for the SHA of the index star 84.

The user then computes the polar distance, PD, for the two stars. Only simple arithmetic is required for this computation. The PD is 90° minus DEC for stars on the same side of the celestial equator as the pole being used, and 90° plus the DEC for stars on the opposite side of the celestial equator from the pole being used. The turret vernier indicators 42 and 44 are set on the appropriate protractors 40 and 38, respectively, for each of the appropriate stars.

The instrument may be then raised to the eye and oriented to the sky by pointing the turret telescope 34 at the axis star 82. The entire instrument is then rotated around the axis of the sky telescope 34 until the star assigned to the reference turret 36, index star 84, appears in the field of view. Both stars are then centered on crosshairs 54. With this setting, the position of the instrument is now fixed with respect to the celestial objects chosen and will follow them throughout their journey across the sky. If the celestial pole is the user's local pole, as it usually will be, the user's local latitude will be the elevation of the central axis above the horizon. This is best seen in FIG. 1 wherein the arrow 47, being a projection of the axis of the instrument, points directly at the user's local celestial pole.

To find local latitude and the local hour angle of Aries, LHAγ, the horizon assembly 12 of the instrument is used to locate the local horizon. At this point, the sky telescope assembly 21 has been locked to the sky elbow assembly 14 which in turn is locked to the periscope "T" assembly 15. In addition, graduated wheel 80 has been locked to periscope "T" assembly 15 in such a way that indicator 76 reads, on wheel 80, the SHA of index star 84. In this way, LHAγ can be read directly from wheel 80 by reference to indicator 30, when crosshair 74 is aligned with the local horizon.

The horizon elbow assembly 23 is then made free to rotate by releasing its locking screw and, likewise, the horizon telescope is free to rotate in the horizon periscope tube 62. The horizon telescope and horizon elbow is then rotated until the horizon appears in the annular field of view as seen by the user 86 looking through the ocular C. The limbs of the hair 74 will appear in the view. The telescope 64 is then rotated so the limbs of the hair align precisely with the visible horizon. The parts are then locked together. It is not necessary for the visible horizon and the hair of reticle 74 to be aligned with the horizon crosshair of reticle 54.

Figure 5:
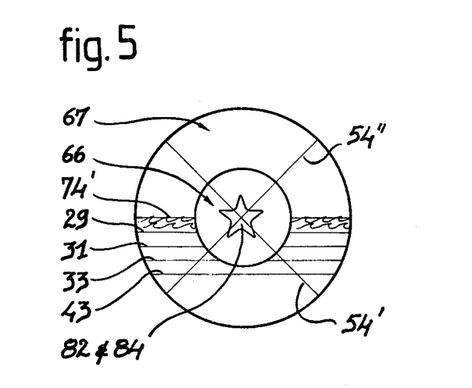
FIG. 5 illustrates the view the user sees through the sky telescope ocular when the reference stars and horizon are properly positioned for a sighting.

The view at this point is best seen by reference to FIG. 5. In the central portion of the view 66 is seen the two superimposed star images, axis star 82 and the index star 84. These are precisely centered at the juncture of the crosshairs 54' and 54". The annular portion of the view 67 shows the horizon aligned with the hair 74'. This figure also shows height of eye correction markings 29, 31, 33, and 43 for adjusting for the viewer's height of eye above the surface of the earth. When mirror 48 is replaced by a beam combiner, the horizon image will also be seen in the center of the view.

The local latitude is read directly from the indicator on vernier 68 by reference to protractor 70. The LHAγ is read west of 0 (the prime celestial meridian) by reading the indicator or vernier 78 with reference to the graduated wheel 80.

The user then determines the Greenwich hour angle of Aries, GHAγ, for the moment of star observation by reference to a watch and a Nautical Almanac, the position of the prime celestial meridian west of the prime terrestrial meridian being listed in the Nautical Almanac for every second of the year. The user adds or subtracts GHAγ and LHAγ to obtain local longitude.

This method of position determination also works for the sun, moon and planets if their approximate momentary position is calculated by reference to an almanac for the approximate time of anticipated observation. The user may anticipate a 5 or 10-minute window during which a sight is expected to be made and compute, ahead of time, the SHA and PD of the two target objects. Height of eye corrections are made by means of the supplementary crosshairs 29, 31, 33 and 43 on the reticle 74 of the horizon telescope 64. Celestial objects at low (below about 7° above the horizon) altitude should not be employed because atmospheric refraction significantly alters their true altitude.

Because the mirrors of the present instrument rotate around the axis of sight, instead of perpendicular to it as in the case of the index mirror of a sextant, scales of the present instrument (the wheels and protractors) yield an accuracy of measurement equivalent to that of a sextant arc of double the radius. Further, the instrument of the present invention does not lose angular field view as does a sextant during a high altitude sighting. In addition, the horizon element can be used for observation of either east or west horizons, giving the instrument flexibility in the case one horizon is obscured or obstructed.

Placement of the prismatic beam splitter 52 in the sky telescope 34 permits the user of the present invention to face a celestial object, point and sight. This direct-viewing arrangement is the most natural for the human user of any instrument and is far easier to use than a sextant in which the user is required to "drop" a celestial object to the horizon or else to pre-calculate its approximate anticipated altitude. In addition, it is clear that only simple arithmetic is required for computations. There is no requirement to convert to rectangular coordinates for representation on flat charts or maps. All computations occur in a single coordinate system, the spherical. In addition, no assumed position, AP, is needed. This makes the instrument particularly useful in emergency situations where the user is lost or possesses erroneous information. Since no knowledge of spherical trigonometry or even of the navigational triangle is required, the use of the instrument can be quickly learned by relatively untrained or inexperienced persons.

Figure 6:
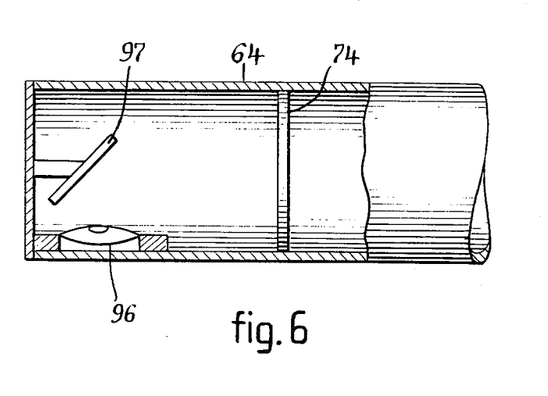
FIG. 6 illustrates the artificial horizon assembly.

As seen in FIG. 6, instead of use of a horizon telescope, an artificial horizon comprising a tube 64 with a bubble level 96 located in the base thereof with a diagonal mirror 97 to provide an image displaced from the axis of the horizon periscope 62 may be used. When that bubble level is seen in the annular field of view 67 with appropriate crosshairs, the instrument may be used where no horizon is usable, for example, almost anywhere on land or in the air.

Figure 4:
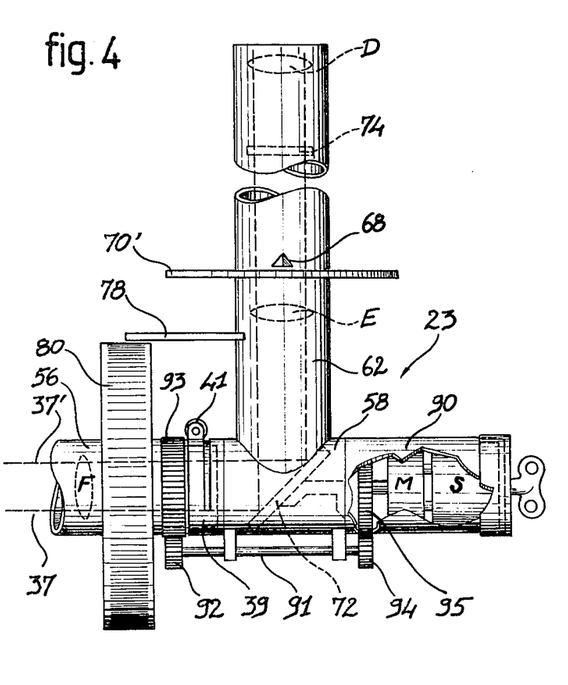
FIG. 4 illustrates a motorized embodiment containing a motor and power assembly in an extension tube mounted on the horizon elbow in a side section view partly broken away to show the interior parts.

FIG. 4 shows another embodiment in which there is a drive means for relative motion between the horizon telescope and horizon elbow assemblies 22, 23 and the sky assembly 10 to which the horizon wheel assembly 17 has been locked. The drive means comprises a tubular extension 90 attached to the distal end of the horizon elbow axial tube 58 which contains a motor M and a spring drive mechanism S. A battery may be used in place of the spring. In the preferred embodiment, the motor is spring wound capable of running during the anticipated time window for the celestial sight. The motor is geared to drive shaft 91 which in turn drives gear 92 with respect to gearing 93 secured to the circle assembly axial tube 56. The gearing 92, 93, 94 and 95 is chosen to provide a sidereal rate of drive of the horizon assembly with respect to the sky assembly. Thus, when the horizon is held fixed in the field of view such as seen in FIG. 5, the sky assembly will track the stars until the appropriate settings can be made. The instrument tracks the axis and index stars automatically, freeing the user to adjust the latitude and LHAγ at leisure. Once this has been finally adjusted, the motor is disengaged and the time noted so that the Greenwich hour angle of Aries, GHAγ, may be obtained from the Almanac for that second of the year. As before, the GHAγ is added to or subtracted from the LHAγ to obtain local longitude.

It should be understood that various modifications within the scope of this invention can be made by one of ordinary skill in the art without departing from the spirit thereof. For example, small mirror 48 could be a beam splitter, acting as a beam combiner, like beam combiner 52. Likewise, erecting lenses or prisms, such as lens B (and/or E) are not needed, where terrestrial orientation of the image is not relevant. The beam splitter(s)/combiner(s) may also be pellicles rather than prisms. The graduated wheel may be calibrated in hours rather than degrees. Another possible alteration is a rearrangement of internal objective and collimation optics whereby the secondary objective lens serving the sky periscope turret would be located at the external opening of the sky periscope turret, where it would serve as a combined objective lens and foreign matter excluder. It should be understood that in FIG. 5 the crosshairs 54', 54" are not always oriented at 45° to horizon line 74'. I therefore wish my invention to be defined by the scope of the appended claims as broadly as the prior art will permit, and in view of this specification if need be. Either crosshair 54 and 74, but not both, can be eliminated. The instrument can be built completely without internal optical lenses, if desired.

I claim:

1. A celestial navigation and position locating instrument comprising in operative combination:
   (a) a sky assembly having means for simultaneous sighting of two celestial objects and superimposing the images thereof centered on crosshairs in a single field of view, at least one of which celestial objects is viewed by direct sighting;
      (i) positions of said celestial objects sighting means being adjustable with respect to each other; and
      (ii) the positions of said celestial objects sighting means being settable for SHA and PD for preselected celestial objects; and
   (b) a horizon assembly movably secured to said sky assembly and having means for sighting a horizon,
      (i) the position of said horizon sighting means being adjustable with respect to said sky assembly so that local latitude and LHAγ are locatable on setting means associated with said horizon sighting means and said sky assembly, respectively,
      (ii) an image of said horizon is visible in an annular region around the central field of view of said celestial objects, and
      (iii) said horizon sighting means being adjustable so that a horizon line thereof can be set to coincide with the local horizon;
   (c) said horizon assembly having a single calibrated wheel mounted in conjunction with said horizon sighting means calibrated in 360° for reading SHA therefrom;
   (d) said sky assembly comprising a sky telescope assembly and a sky elbow assembly rotatably journaled thereto, said sky elbow having a first vernier disposed to read the SHA of said sky telescope on said calibrated wheel mounted in conjunction with said horizon sighting means for reading the SHA of one of said celestial objects sighted with said sky telescope assembly; and
   (e) said single calibrated wheel permitting SHA readings of both celestial objects.

2. A celestial navigation and position locating instrument as in claim 1 wherein:
   (a) said horizon assembly includes a natural horizon viewing telescope having a horizon crosshair.

3. A celestial navigation and position locating instrument as in claim 1 wherein:

(a) said horizon assembly includes means for forming an artificial horizon.

4. A celestial navigation and position locating instrument as in claim 1 which includes:
  (a) drive means for rotating the positions of said celestial objects sighting means which are fixed relative to each other with respect to said horizon assembly at a sidereal rate.

5. A celestial navigation and position locating instrument as in claim 2 which includes:
  (a) drive means for rotating the positions of said celestial objects sighting means which are fixed relative to each other with respect to said horizon assembly at a sidereal rate.

6. A celestial navigation and position locating instrument as in claim 3 which includes:
  (a) drive means for rotating the positions of said celestial objects sighting means which are fixed relative to each other with respect to said horizon assembly at a sidereal rate.

7. A celestial navigation and position locating instrument as in claim 1 wherein:
  (a) said sky assembly sky telescope having an objective and ocular lens, a beam splitter disposed to function as a beam combiner, a reticle with crosshairs, and a protractor graduated in degrees for positional indication of PD of a celestial object;
  said sky elbow assembly comprising a pair of tubes joined at one end thereof at a 90° angle having a diagonal mirror disposed at the juncture thereof, said elbow having a second vernier indicator disposed to permit reading of said sky telescope protractor, and said first vernier for reading of SHA on said calibrated wheel being mounted thereon;
  and which sky assembly includes a periscope "T" tube assembly comprising an axial tube coaxially aligned with the axis of said sky wheel tubular body and having mounted medially thereof at 90° to said axis a periscope tube having a 90° turret rotatably mounted thereon, a small diagonal mirror mounted at the juncture of the axial tube and said periscope tube; said turret and periscope tube having a cooperating PD protractor and a
  first PD vernier indicator; said periscope tube having a second vernier attached to it for reading SHA from the calibrations of said calibrated wheel of said horizon assembly;
  (b) said horizon assembly calibrated wheel being mounted on a tubular body perpendicular to the axis thereof, said axis being coaxial with the axis of said periscope "T" tube assembly axial tube, said calibrated wheel axial tube and said sky elbow; said second periscope tube vernier and said first sky assembly elbow vernier being disposed to read SHA from the calibrations on said calibrated wheel; and said horizon assembly including:
    (i) a horizon elbow assembly comprising an axial tube closed at one end coaxial with the axis of said horizon assembly calibrated wheel axial tube, a periscope tube mounted at 90° thereto, said setting means comprising a vernier indicator for reading LHA$\gamma$ on said horizon assembly calibrated wheel, and a diagonal mirror mounted at 45° at the juncture of said tubes;
    (ii) a horizon telescope assembly axially rotatably mounted in said horizon elbow periscope tube, said horizon elbow periscope tube and said horizon telescope assembly having a protractor calibrated in degrees and a vernier indicator mounted thereon and disposed in association to read local latitude therefrom;
  (c) the axis of said periscope tube of said sky elbow assembly, said periscope "T" tube assembly and said horizon elbow assembly each being disposed at 90° to the central axis of said instrument defined by the common central axis of said periscope "T" tube and calibrated wheel tubular body;
  (d) said sky telescope being mounted on a turret at 90° to the sky elbow periscope tube, and the optical axis of said sky telescope being aligned at 90° to said tube;
  (e) said optical elements being aligned to provide said central and annular view fields; and
  (f) said assemblies being rotatable each in the adjacent other assemblies and releasably securable in any rotationally desired position.

8. A celestial navigation and position locating instrument as in claim 7 wherein:
  (a) said horizon assembly includes a real horizon viewing telescope having a horizon crosshair.

9. A celestial navigation and positon locating instrument as in claim 7 wherein:
  (a) said horizon assembly includes means for forming an artificial horizon.

10. A celestial navigation and position locating instrument as in claim 7 which includes:
  (a) drive means for rotating the positions of said celestial objects sighting means which are fixed relative to each other with respect to said horizon assembly at a sidereal rate.

* * * * *